US008638714B2

(12) United States Patent
Walker et al.

(10) Patent No.: US 8,638,714 B2
(45) Date of Patent: Jan. 28, 2014

(54) FAST CHANNEL SWITCHING IN A MULTIMEDIA BROADCAST SYSTEM

(75) Inventors: Gordon Kent Walker, Poway, CA (US); Bruce Collins, San Diego, CA (US); Shusheel Gautam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 715 days.

(21) Appl. No.: 11/612,451

(22) Filed: Dec. 18, 2006

(65) Prior Publication Data

US 2007/0177734 A1  Aug. 2, 2007

Related U.S. Application Data

(60) Provisional application No. 60/756,080, filed on Jan. 4, 2006.

(51) Int. Cl.
*H04W 4/00* (2009.01)

(52) U.S. Cl.
USPC .......... 370/328; 370/240; 370/335; 370/342; 370/441; 370/235

(58) Field of Classification Search
USPC .......... 370/240, 335, 342, 328, 441, 235, 538
See application file for complete search history.

(56) References Cited

U.S. PATENT DOCUMENTS

| 2005/0141475 A1* | 6/2005 | Vijayan et al. ............... 370/345 |
| 2005/0226190 A1* | 10/2005 | Lam ............................. 370/338 |
| 2007/0064707 A1 | 3/2007 | Pandel et al. |

FOREIGN PATENT DOCUMENTS

| JP | 2007518290 T | 7/2007 |
| KR | 1020080092932 | 10/2008 |
| WO | 2005043794 | 5/2005 |
| WO | 2005050901 A1 | 6/2005 |

OTHER PUBLICATIONS

FLO forum Technical Contribution to TR47—Dec. 22, 2005, Forward Link Only Air Interface Specification, Rev. 1.1; submitted as an IDS reference by the Applicant on Feb. 21, 2008.*
TIA: "Forward Link Only Air Interface Specification Rev. 1.1" Internet Citation, FLO Forum Technical Contribution to TR47, Dec. 22, 2005, pp. 1-164, XP002387062, Retrieved from the Internet: URL: http://ftp.tiaonline.org/TR-47/TR471/Working/20060110-Arlington-meeting1/TR471-20060110-004a_FLO%020AIS.pdf> retrieved on Jun. 26, 2006, sections 3.1 to 3.2.5.2, 4.1, 4.3.5 and 4.3.5.1.
International Search Report—PCT/US07/060118, International Search Authority—European Patent Office—Oct. 24, 2007.

(Continued)

*Primary Examiner* — Manpreet Matharu
(74) *Attorney, Agent, or Firm* — Arent Fox LLP

(57) ABSTRACT

A wireless broadcast system is disclosed. The wireless broadcast system includes a transmitter for broadcasting to a wireless communications device. The transmitter receives a plurality of streams on a logical channel, wherein one of the streams contains signaling. The transmitter arranges the streams such that the stream containing the signaling is broadcast after the other streams on the logical channel. The wireless communications device receives the streams broadcast on a logical channel broadcast in a frame, and acquires the logical channel during the broadcast of the frame in response to a prompt received during the broadcast of the same frame.

41 Claims, 7 Drawing Sheets

(56) References Cited

OTHER PUBLICATIONS

Translated summary of Office Action in Japanese application 2008-549645 corresponding to U.S. Appl. No. 11/612,451, citing WO05043794 and TIA_Forward_Link_pages_1_164_XP002387062 dated Jan. 25, 2011.

Written Opinion—PCT/US2007/060118—ISA/EPO—Oct. 24, 2007.

* cited by examiner

FAST CHANNEL SWITCHING IN A MULTIMEDIA BROADCAST SYSTEM

CLAIM OF PRIORITY UNDER 35 U.S.C. §119

The present Application for Patent claims priority to Provisional Application No. 60/756,080 entitled "EARLY ENTRY" filed Jan. 4, 2006, and assigned to the assignee hereof and hereby expressly incorporated by reference herein.

BACKGROUND

1. Field

The present disclosure relates generally to telecommunication systems, and more particularly, to concepts and techniques for switching channels on a wireless communications device in a multimedia broadcast system.

2. Background

Recent advances in technology has dramatically increased the capabilities of wireless communication devices. Today, many wireless communication devices provide, in addition to tradition telephony, multimedia broadcast services in a mobile environment. Various multimedia broadcast systems are currently being deployed and developed to efficiently and economically distribute multimedia content to millions of wireless communication devices. One example is Qualcomm's MediaFLO technology. MediaFLO technology allow users to surf channels of multimedia content on a wireless communications device typically used for traditional cellular voice and data services.

The multimedia content broadcast on each channel is often referred to as a service. Each service includes one or more flows. By way of example, a cable news service may include a video flow, an audio flow, and a signaling flow. The signaling flow may include various items such as a decryption key and other information needed to receive the video and audio portion of the broadcast for that service. At the application level, each flow is carried in a stream. The streams for each service are transmitted through the physical layer on one or more media logical channels.

One goal of most multimedia broadcast systems is to create an enjoyable viewing experience for a user on a wireless communications device. Technology that allows a user to surf channels of multimedia content quickly goes a long way towards achieving this objective. This requires a methodology that enables a wireless communications device to rapidly acquire media logical channels and access any information (e.g., a decryption key) required to receive the service.

SUMMARY

One aspect of a wireless communications device is disclosed. The wireless communications device includes a receiver configured to receive a plurality of streams on a logical channel broadcast in a frame, and a processor configured to acquire the logical channel during the broadcast of the frame in response to a prompt received during the broadcast of the same frame.

Another aspect of a wireless communications device is disclosed. The wireless communications device includes means for receiving a plurality of streams on a logical channel broadcast in a frame, and means for acquiring the logical channel during the broadcast of the frame in response to a prompt received during the broadcast of the same frame.

One aspect of a transmitter is disclosed. The transmitter includes a receiver configured to receive a plurality of streams on a logical channel, wherein one of the streams contains signaling. The transmitter further includes a processor configured to arrange the streams such that the stream containing the signaling is broadcast after the other streams on the logical channel.

Another aspect of a transmitter is disclosed. The transmitter includes means for receiving a plurality of streams on a logical channel, wherein one of the streams contains signaling. The transmitter further includes means for arranging the streams such that the stream containing the signaling is broadcast after the other streams on the logical channel.

One aspect of a method for receiving a wireless broadcast is disclosed. The method includes receiving a plurality of streams on a logical channel broadcast in a frame, and acquiring the logical channel during the broadcast of the frame in response to a prompt received during the broadcast of the same frame.

One aspect of a method of broadcasting in a wireless medium is disclosed. The method includes receiving a plurality of streams on a logical channel, wherein one of the streams contains signaling. The method further includes broadcasting the streams with the stream containing the signaling following the other streams on the logical channel.

One aspect of a computer program product is disclosed. The computer program product includes computer-readable medium comprising code for causing a computer to acquire a logical channel having a plurality of streams broadcast in a frame, the code further causing the computer to acquire the logical channel during the broadcast of the frame in response to a prompt received during the broadcast of the same frame.

Another aspect of a computer program product is disclosed. The computer program product includes computer-readable medium comprising code to cause a computer to arrange a plurality of streams received on a logical channel for broadcasting, wherein one of the streams contains signaling, and wherein the code further causes the computer to arrange the streams such that the stream containing the signaling is broadcast after the other streams on the logical channel.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Figure 1:
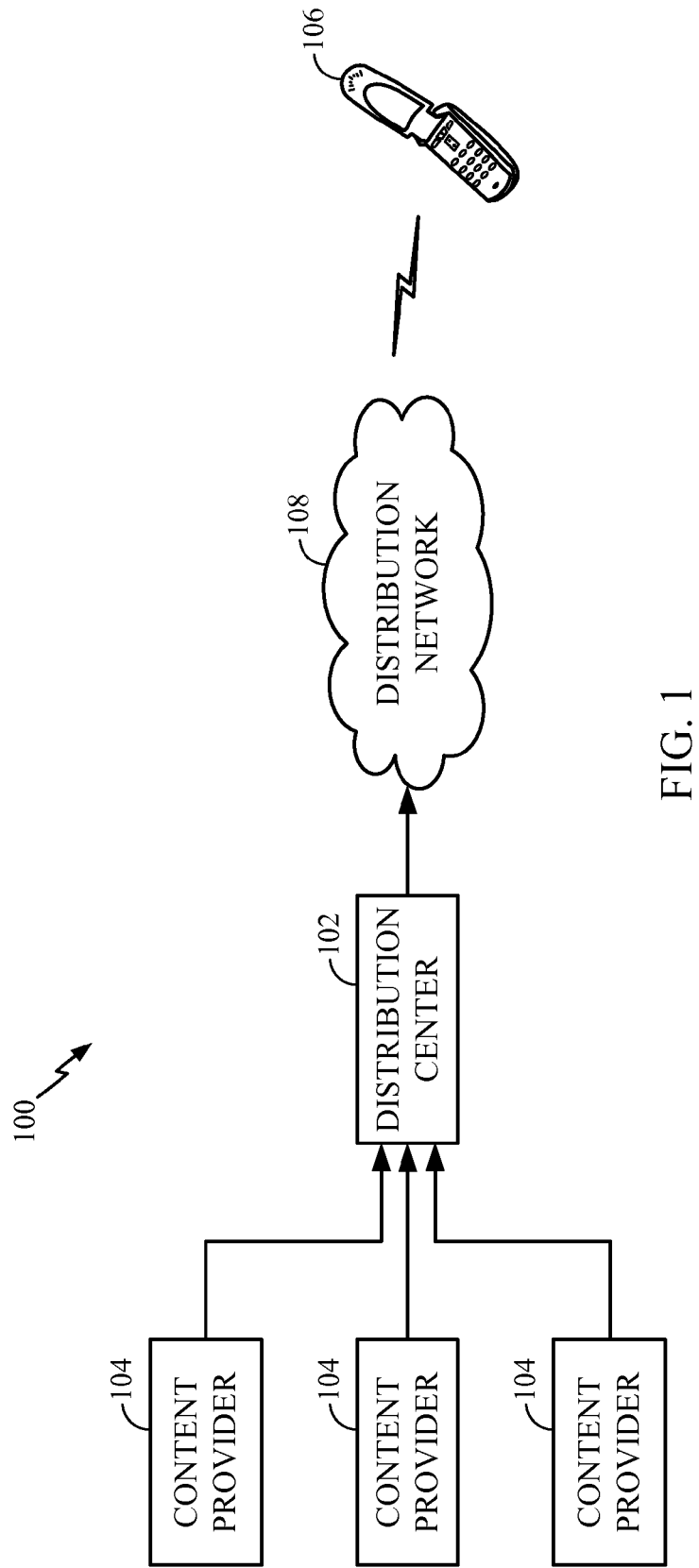
FIG. 1 is a conceptual block diagram illustrating an example of a multimedia broadcast system.

FIG. 1 is a conceptual block diagram illustrating an example of a multimedia broadcast system. As used herein, "broadcast" and "broadcasting" refer to transmission of multimedia content to a group of users of any size and includes a broadcast, anycast, multicast, unicast, datacast, and/or any other suitable communications session. The multimedia broadcast system 100 is shown with a distribution center 102 which serves as an access point for various content providers 104. In this example, the distribution content 102 is responsible for mapping the different media streams for each service to media logical channels for distribution to users through a distribution network 108.

A wireless communications device 106 moving through the multimedia broadcast system 100 can receive the various services from the distribution network 108 using any suitable wireless interface. The wireless communications device 106 may be a cellular telephone, a personal digital assistant (PDA), a television receiver, a personal computer, a laptop computer, a game console, or any other suitable device capable of receiving multimedia content.

One non-limiting example of a wireless interface is an orthogonal frequency division multiplexing (OFDM) interface. OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

Figure 2:
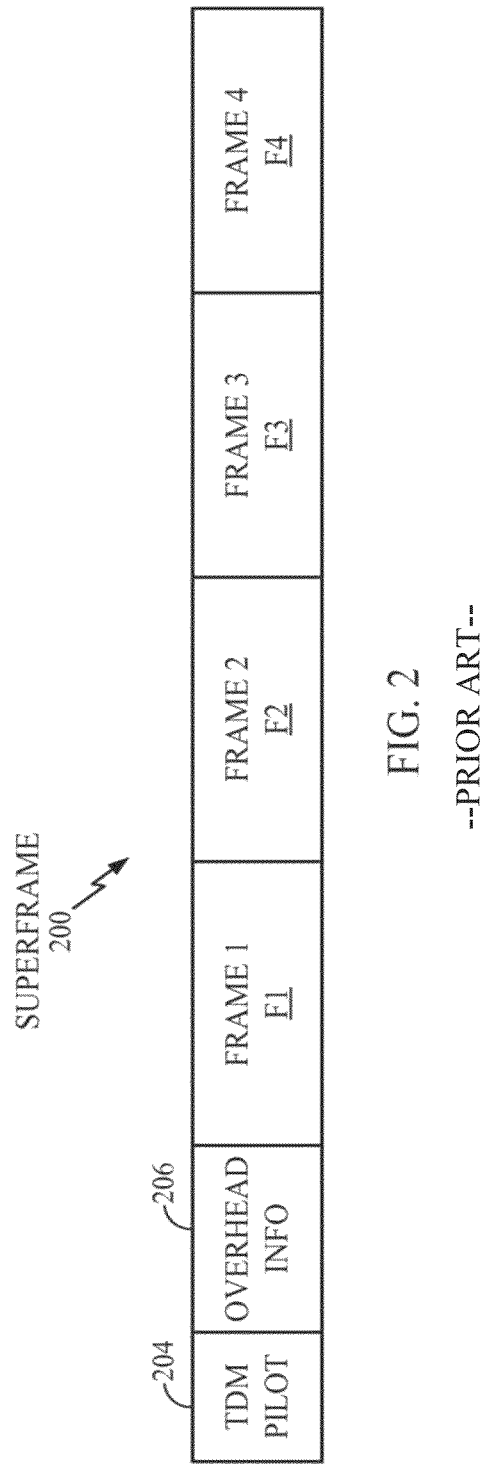
FIG. 2 is a diagram illustrating an example of a data structure for a super-frame in the time domain.

In an OFDM wireless interface, content is generally broadcast in a data structure know as a super-frame. FIG. 2 is a diagram illustrating an example of a data structure for a super-frame in the time domain. The super-frame 200 includes four frames F1-F4. The media logical channels are broadcast in the four frames F1-F4. Each media logical channel may be allocated a fixed or variable number of time slots in each super-frame 200 depending on the payload, the availability of time slots in the super-frame, and possibly other factors. Each time slot in the super-frame 200 may include one or more OFDM symbols. An OFDM symbol is a composite signal having N modulated sub-carriers. The super-frame 200 also includes a TDM pilot 204 and overhead information 206. The TDM pilot 204 may be used by the wireless communications device for synchronization (e.g., frame detection, frequency error estimation, timing acquisition, and so on) and channel estimation. The overhead information 206 indicates the specific location of each media logical channel within the super-frame 200.

The protocol stack for the multimedia broadcast system described thus far includes an application layer, which resides above a stream layer, which resides above a medium access control (MAC) layer, which resides above a physical layer. The application layer controls the broadcast of the multimedia content, access to the content, and so on. The stream layer provides binding of application layer packets to the media streams on the media logical channels. The MAC layer performs multiplexing of packets for the different media streams associated with each media logical channel. The physical layer provides a mechanism to broadcast the media streams through various communication channels in the multimedia broadcast system.

Figure 3:
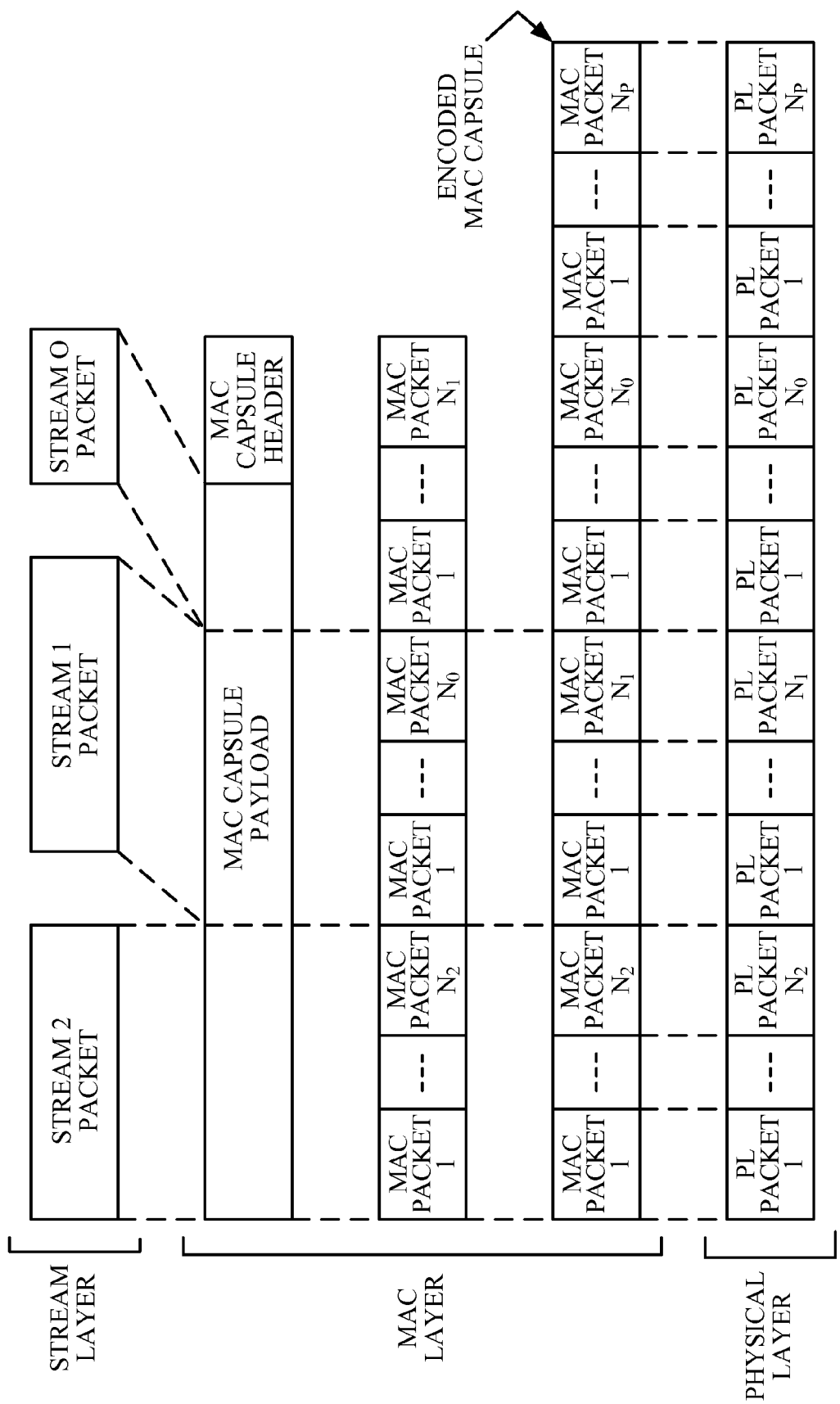
FIG. 3 is a diagram illustrating an example of the stream layer, MAC layer, and physical layer for one media logical channel in one super-frame.

FIG. 3 is a diagram illustrating an example of the stream layer, MAC layer, and physical layer for one media logical channel in one super-frame. In this example, the media logical channel includes three media streams, which are designated as streams 0, 1, and 2. Stream 0 may be used to carry signaling for the media logical channel, and streams 1 and 2 may be used to carry multimedia content (e.g., video, audio, etc.) The signaling may be for various items such as a decryption key and other information needed to receive the other media streams on the media logical channel. The stream layer provides one stream layer packet for each media stream broadcast on the media logical channel in super-frame. In this example, the stream layer generates a stream 0 packet, a stream 1 packet, and a stream 2 packet for the super-frame 200 shown.

The MAC layer forms a MAC capsule for the media logical channel for each super-frame. The MAC capsule includes a MAC capsule payload and a MAC capsule tail. The MAC capsule tail carries embedded overhead information for the media logical channel, which includes the location of the media logical channel in the next super-frame. The MAC capsule payload carries the stream layer packets to be broadcast in the super-frame for the media logical channel. To reduce acquisition latency on the wireless communications device, the stream 0 packet should be positioned at the end of the MAC capsule payload. By positioning the stream 0 packet at the end of the MAC capsule payload, a wireless communications device that switches to a new service (i.e., new media logical channel) in the middle of a super-frame can retrieve the decryption key to decrypt any portion of the stream 1 or 2 packets it receives on the new media logical channel during that super-frame. This eliminates the delay that might otherwise occur if the wireless communications device had to wait until the next super-frame to acquire the new media logical channel because the decryption key for the current super-frame had already been broadcast before the wireless communications device switched to the new service.

The MAC layer also fragments the MAC capsule into multiple MAC packets. In this example, the stream 2 packet is divided into $N_2$ MAC packets, and the stream 1 packet is divided into $N_1$ MAC packets, and the stream 0 and MAC capsule tail are divided into $N_0$ MAC packets. To facilitate independent reception of the media streams, each stream layer packet is sent in an integer number of MAC packets. Any padding octets that are required should be positioned at the beginning of the MAC capsule to further reduce acquisition latency when switching to a new service by increasing the useable content that the wireless communications device may receive.

The MAC layer also performs block encoding on the MAC packets for the media logical channel and generates $N_p$ parity MAC packets. The parity MAC packets are appended to the block of MAC packets to create an encoded MAC capsule. The physical layer receives the encoded MAC capsule and processes (e.g., encodes, interleaves, and symbol maps) each MAC packet to generate a corresponding physical layer packet.

When using Reed-Solomon (R-S) bock codes, it is not uncommon for the MAC layer to perform R-S sequencing to achieve the maximum time diversity, which in turn, provides maximum gain for the block code. R-S sequencing involves interleaving the contents of the encapsulated MAC capsules for the media logic channels carried in the super-frame 200. To further reduce acquisition latency at the wireless communications device, R-S sequencing, or any other interleaving process, should be avoided. The media streams should be arranged in the super-frame to maintain its contiguous nature.

Figure 4:
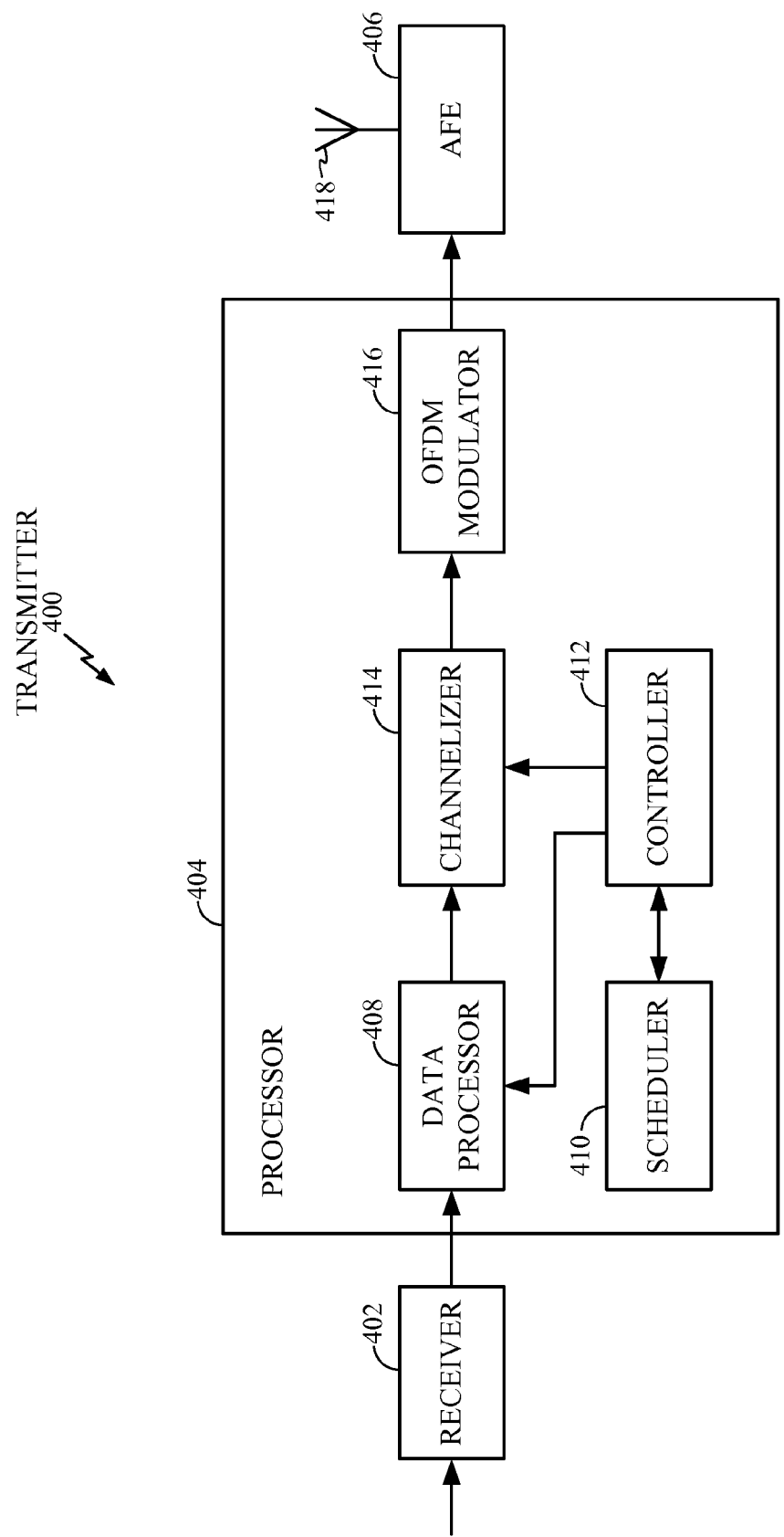
FIG. 4 is a block diagram illustrating an example of a transmitter in the distribution network.

FIG. 4 is a block diagram illustrating an example of a transmitter in the distribution network. The transmitter 400 includes a receiver 402, a processor 404 and an analog front end (AFE) 406. The processor 404 includes a data processor 408, a scheduler 410, a controller 412, a channelizer 414, and an OFDM modulator 416.

The receiver 402 receives multiple media streams broadcast through the distribution network and provides one stream layer packet for each media stream to a data processor 408 for each super-frame. The data processor 408 also receives embedded overhead information from the controller 412 for each media logical channel and appends the overhead information to the appropriate stream layer packet for that media logical channel. The data processor 408 then processes each stream layer packet in accordance with a "mode" for that stream to generate a corresponding data symbol stream. The mode for each media stream identifies, for example, the code rate, the modulation scheme, and so on, for the media stream. As used herein, a data symbol is a modulation symbol for data, an overhead symbol is a modulation symbol for overhead information, a pilot symbol is a modulation symbol for a pilot, and a modulation symbol is a complex value for a point in a signal constellation used for a modulation scheme (e.g., M-PSK, M-QAM, and so on).

The data processor 408 also receives composite overhead information to be sent at the start of each super-frame from the controller 412. The data processor 408 processes the composite overhead information in accordance with a mode for the composite overhead information to produce a stream of overhead symbols. The mode used for the composite overhead information is typically associated with a lower code rate and/or a lower order modulation scheme than that used for the media streams to ensure robust reception of the composite overhead information.

A channelizer 414 multiplexes the data, overhead, and pilot symbols into time slots within the super-frame. The time slots are assigned by the scheduler 410. An OFDM modulator 416 converts the composite symbol stream into N parallel streams and performs OFDM modulation on each set of N symbols to produce a stream of OFDM symbols to the AFE 406. The AFE 410 conditions (e.g., converts to analog, filters, amplifies, and frequency upconverts) the OFDM symbol stream and generates a modulated signal that is broadcast from an antenna 418.

Figure 5:
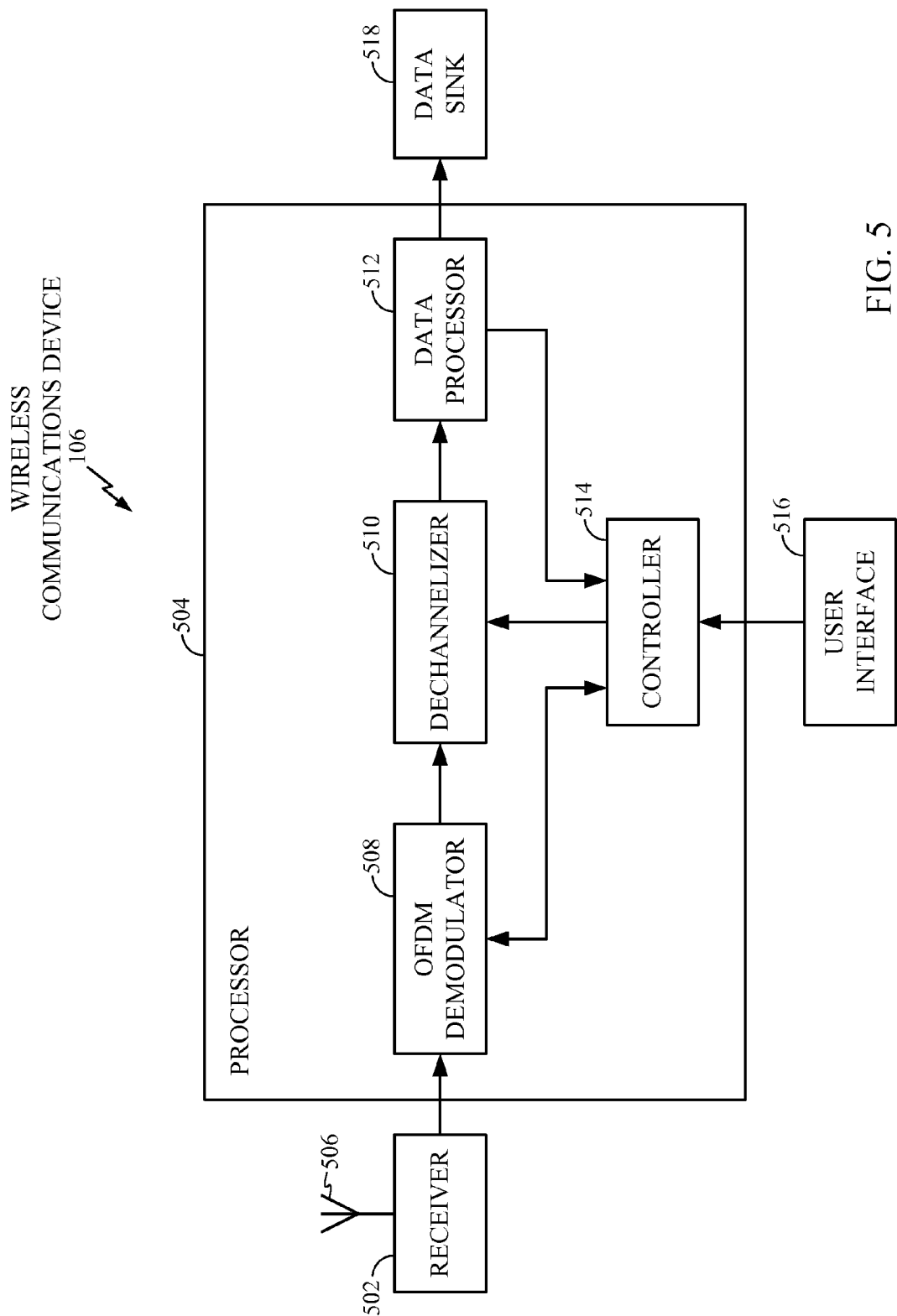
FIG. 5 is a block diagram illustrating an example of a wireless communications device.

FIG. 5 is a block diagram illustrating an example of a wireless communications device. The wireless communications device 106 includes a receiver 502, a processor 504, a user interface 516, and a data sink 518. The processor 504 includes an OFDM demodulator 508, a dechannelizer 510, and a data processor 512.

An antenna 506 receives the modulated signal broadcast by the transmitter in the distribution network and provides the received signal to the receiver 502. The receiver 502 conditions, digitizes, and processes the received signal and provides a sample stream to the OFDM demodulator 508. The OFDM demodulator 508 performs OFDM demodulation on the sample stream to recover the data, overhead, and pilot symbols. The controller 514 derives a channel response estimate for the wireless link between the transmitter 400 (see FIG. 4) and the wireless communications device 106 based on the received pilot symbols. The OFDM demodulator 508 further performs coherent detection (e.g., equalization or matched filtering) on the received data and overhead symbols with the channel response estimate and provides to the dechannelizer 510 estimates of the data and overhead symbols.

The controller 514 receives a selection from the user interface 516 for a service. The controller 514 then determines the time slot assignment for the media logical channel carrying the service based on either (1) the composite overhead information broadcast at the start of the current super-frame or (2) the embedded overhead information broadcast in the MAC capsule tail received in a previous super-frame for the media logical channel. The controller 514 then provides a control signal to the dechannelizer 510. The dechannelizer 510 performs demultiplexing of the data and overhead symbol estimates and provides the demultiplexed data and overhead symbol estimates to the data processor 512. The data processor 512 processes (e.g., symbol demaps, deinterleaves, and decodes) the overhead symbol estimates in accordance with the mode used for the composite overhead information and provides the processed overhead information to the controller 514. The data processor 512 also processes the data symbol estimates for the media logical channel carrying the service selected by the user, in accordance with the mode used for that stream, and provides a corresponding processed data stream to a data sink 518. The data sink 518 represents the upper layers, which may include an application for presenting the video and audio portion of the selected service to a display for viewing by a user.

When a new service is selected on the wireless communications device 106, the location of the media logical channel broadcasting the service is needed. In most conventional devices, the composite overhead information is read only in certain cases (e.g., when a new service is selected). Once a new service is acquired, the location of the media logical channel in each subsequent super-frame is determined by embedded overhead information broadcast in a MAC capsule tail attached to the MAC capsule payload. As a result, when the conventional device is switched to a new service in the middle of a super-frame, the media logical channel carrying that service cannot be acquired until the composite overhead information is read at the beginning of the next super-frame. To reduce acquisition latency at wireless communications device 106, the controller 516 should be configured to acquire the media logical channel for the new service during the current super-frame. This can be accomplished in a number of ways. By way of example, the controller 514 can be forced into a mode where it reads the composite overhead information in each super-frame under conditions that are likely to result in a change of service (e.g., browsing real-time service menus in a media program guide). Alternatively, the controller 514 can be configured to read the composite overhead information for each super-frame, thus eliminating the need to for embedded overhead information.

Referring to FIGS. 4 and 5, both the transmitter 400 and the wireless communications device 106 includes a processor 404 and 504, respectively. Each processor is shown with various blocks to illustrate its functionality. These functional blocks may be implemented in hardware, software, firmware, middleware, microcode, hardware description languages, or any combination thereof. Each functional block may be implemented separately, integrated with one or more functional blocks, or distributed across multiple entities.

When implemented in hardware, either in whole or part, the processor may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, state machines, discrete gate or transistor logic, discrete hardware components, or any combination thereof to perform some or all of the processor functions described herein.

When implemented in software, firmware, middleware or microcode, in whole or part, the processor may be implemented with a special purpose or general purpose computer, and may also include computer-readable media for carrying or having program code or instructions that, when executed, performs some or all of the processor functions described herein. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Figure 6:
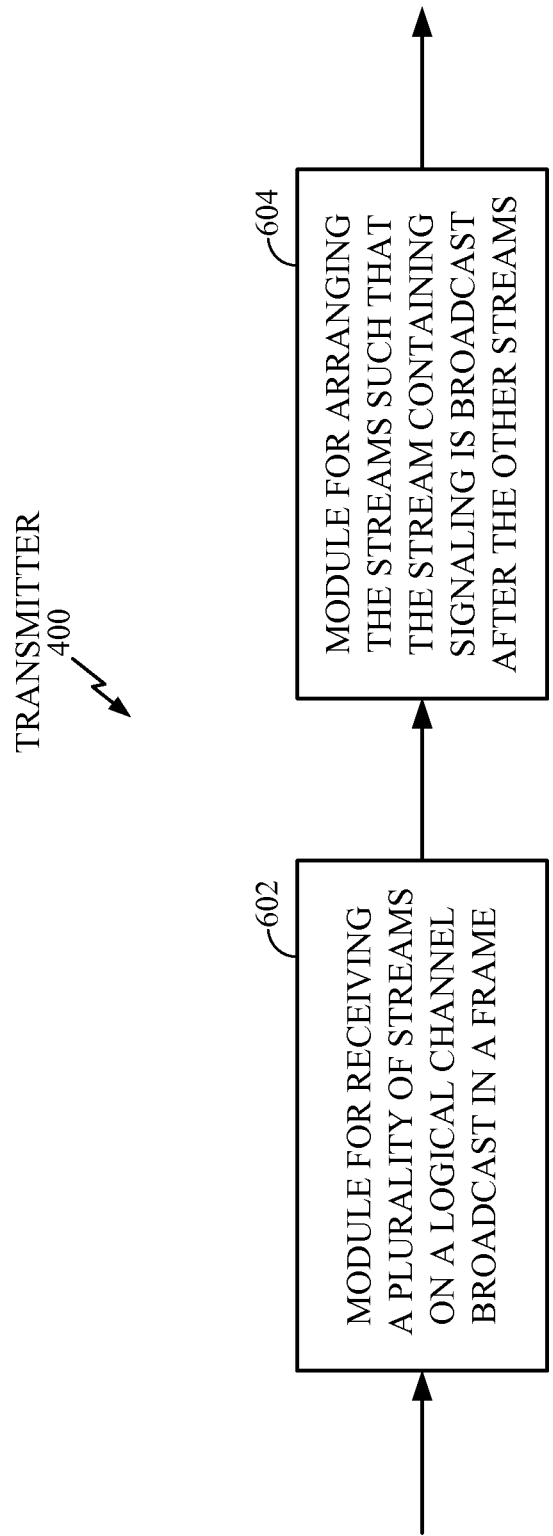
FIG. 6 is a functional block diagram illustrating an example of transmitter.

FIG. 6 is a functional block diagram illustrating an example of transmitter. The transmitter 400 includes a module 602 for receiving a plurality of streams on a logical channel, wherein one of the streams contains signaling. The transmitter 500 further includes a module 604 for arranging the streams such that the stream containing the signaling is broadcast after the other streams on the logical channel.

Figure 7:
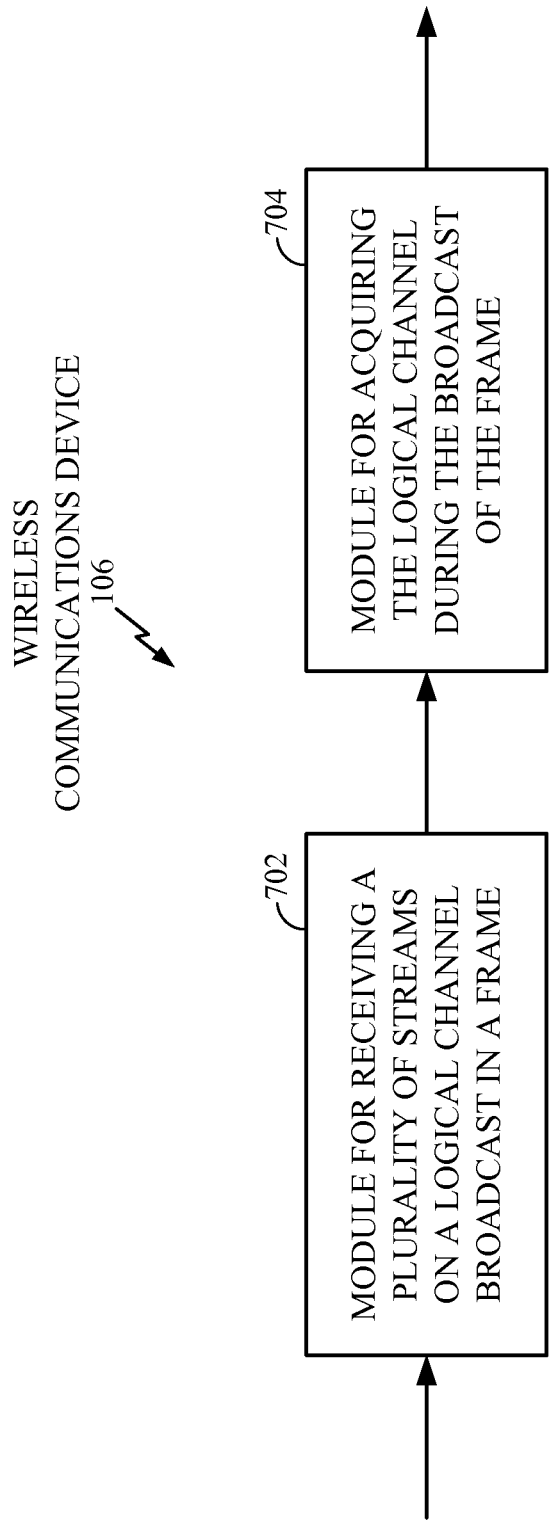
FIG. 7 is a functional block diagram illustrating an example of a wireless communications device.

FIG. 7 is a functional block diagram illustrating an example of a wireless communications device. The wireless communications device 106 includes a module 702 for receiving a plurality of streams on a logical channel broadcast in a frame, and a module 704 for acquiring the logical channel during the broadcast of the frame in response to a prompt received during the broadcast of the same frame.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless communications device, comprising:
 a receiver configured to receive a plurality of streams on a logical channel broadcast in a payload in a frame, wherein the frame is accompanied by composite overhead information; and
 a processor configured to:
  acquire the logical channel during the broadcast of the same frame using the composite overhead information and in response to a prompt received during the broadcast of the same frame,
  read the composite overhead information in response to a trigger that precedes the prompt, and
  obtain signaling from the last stream of the plurality of streams in the same payload.

2. The wireless communications device of claim 1, wherein the prompt comprises a selection for a new service, the new service being broadcast on the logical channel.

3. The wireless communications device of claim 1, wherein the processor is further configured to acquire the logical channel without any content from another frame.

4. The wireless communications device of claim 1, wherein the signaling includes a decryption key for at least some of the other streams of the plurality of streams on the logical channel.

5. The wireless communications device of claim 1, wherein the processor is further configured to contiguously play out content carried in the plurality of streams.

6. The wireless communications device of claim 1, wherein the processor is further configured to read the composite overhead information every time the receiver receives composite overhead information.

7. A wireless communications device, comprising:
 means for receiving a plurality of streams on a logical channel broadcast in a payload in a frame, wherein the frame is accompanied by composite overhead information;
 means for acquiring the logical channel during the broadcast of the same frame using the composite overhead information and in response to a prompt received during the broadcast of the same frame;
 means for reading the composite overhead information in response to a trigger that precedes the prompt; and
 means for obtaining signaling from the last stream of the plurality of streams in the same payload.

8. A transmitter, comprising:
 a receiver configured to receive a plurality of streams for configuring a logical channel to be transmitted in a payload in a frame, wherein the frame is accompanied by composite overhead information, wherein the logic channel is acquired using the composite overhead information and in response to a prompt received during transmission of the same frame, and wherein one of the streams of the plurality of streams comprises signaling; and
 a processor configured to:
  read the composite overhead information in response to a trigger that precedes the prompt, and
  arrange the plurality of streams such that the stream comprising the signaling is broadcast as the last stream of the plurality of streams on the logical channel in the same payload in the same frame.

9. The transmitter of claim 8, wherein the processor is further configured to arrange the plurality of streams such that the content carried in the plurality of streams is sufficient to acquire the logical channel without any content from another frame.

10. The transmitter of claim 8, wherein the signaling includes a decryption key for at least some of the other streams of the plurality of streams on the logical channel.

11. The transmitter of claim 8, wherein the processor is further configured to arrange content carried in the plurality of streams for contiguous broadcast.

12. The transmitter of claim 11, wherein the processor is further configured to fragment the plurality of streams into a plurality of packets, to block code the packets, and to arrange the content in the packets for contiguous broadcast.

13. A transmitter, comprising:
means for receiving a plurality of streams for configuring a logical channel to be transmitted in a payload in a frame, wherein the frame is accompanied by composite overhead information, wherein the logic channel is acquired using the composite overhead information and in response to a prompt received during transmission of the same frame, and wherein one of the streams of the plurality of streams comprises signaling;
means for reading the composite overhead information in response to a trigger that precedes the prompt; and
means for arranging the plurality of streams such that the stream of the plurality of streams comprising the signaling is broadcast as the last stream of the plurality of streams on the logical channel in the same payload in the same frame.

14. A method of receiving a wireless broadcast, comprising:
receiving a plurality of streams on a logical channel broadcast in a payload in a frame, wherein the frame is accompanied by composite overhead information;
acquiring the logical channel during the broadcast of the same frame using the composite overhead information and in response to a prompt received during the broadcast of the same frame;
reading the composite overhead information in response to a trigger that precedes the prompt; and
obtaining signaling from the last stream of the plurality of streams in the same payload.

15. The method of claim 14, wherein the prompt comprises selecting a new service, the new service being broadcast on the logical channel.

16. The method of claim 14, wherein the logical channel is acquired without any content from another frame.

17. The method of claim 14, wherein the signaling includes a decryption key for at least some of the other streams of the plurality of streams on the logical channel.

18. The method of claim 14, further comprising contiguously playing out the content carried in the plurality of streams.

19. A method of broadcasting in a wireless medium, comprising:
receiving a plurality of streams for configuring a logical channel to be transmitted in a payload in a frame, wherein the frame is accompanied by composite overhead information, wherein the logic channel is acquired using the composite overhead information and in response to a prompt received during transmission of the same frame, and wherein one of the streams of the plurality of streams comprises signaling;
reading the composite overhead information in response to a trigger that precedes the prompt; and
broadcasting the plurality of streams with the stream comprising the signaling as the last stream of the plurality of streams on the logical channel in the same payload in the same frame.

20. The method of claim 19, wherein the content carried in the plurality of streams is sufficient for a wireless communications device to acquire the logical channel without any content from another frame.

21. The method of claim 19, wherein the signaling includes a decryption key for at least some of the other streams of the plurality of streams on the logical channel.

22. The method of claim 19, wherein content in the plurality of streams are contiguously broadcast.

23. The method of claim 22, further comprising:
fragmenting the plurality of streams into a plurality of packets; and
coding the packets with a block code, wherein the broadcast of the plurality of streams comprises contiguously broadcasting the content in the packets.

24. A computer program product, comprising:
non-transitory computer-readable medium comprising code for causing a computer to:
acquire a logical channel having a plurality of streams broadcast in a payload in a frame, wherein the frame is accompanied by composite overhead information;
acquire the logical channel during the broadcast of the same frame using the composite overhead information and in response to a prompt received during the broadcast of the same frame;
read the composite overhead information in response to a trigger that precedes the prompt; and
obtain signaling from the last stream of the plurality of streams in the same payload.

25. The computer program product of claim 24, wherein the prompt comprises selecting a new service, the new service being broadcast on the logical channel.

26. The computer program product of claim 24, wherein the code further causes the computer to acquire the logical channel without any content from another frame.

27. The computer program product of claim 24, wherein the signaling includes a decryption key for at least some of the other streams of the plurality of streams on the logical channel.

28. The computer program product of claim 24, further comprising code to cause the computer to contiguously play out the content carried in the plurality of streams.

29. A computer program product, comprising:
non-transitory computer-readable medium comprising code to cause a computer to arrange a plurality of streams for configuring a logical channel for broadcasting in a payload in a frame, wherein the frame is accompanied by composite overhead information, wherein the logic channel is acquired using the composite overhead information and in response to a prompt received during broadcasting of the same frame, wherein one of the streams of the plurality of streams comprises signaling, and wherein the code further causes the computer to read the composite overhead information in response to a trigger that precedes the prompt and arrange the plurality of streams such that the stream comprising the signaling is broadcast as the last stream of the plurality of streams on the logical channel in the same payload in the same frame.

30. The computer program product of claim 29, wherein the content carried in the plurality of streams is sufficient for a wireless communications device to acquire the logical channel without any content from another frame.

31. The computer program product of claim 29, wherein the signaling includes a decryption key for at least some of the other streams of the plurality of streams on the logical channel.

32. The computer program product of claim 29, wherein the code further causes the computer to arrange the plurality of streams such that the content in the plurality of streams is contiguously broadcast.

33. The computer program product of claim 29, further comprising code to cause the computer to fragment the plurality of streams into a plurality of packets, and block code the packets, and wherein the code to cause the computer to arrange the plurality of streams for broadcast further causes the computer to arrange the plurality of streams such that the content in the packets is contiguously broadcast.

34. The wireless communications device of claim 1, wherein the processor is further configured to acquire the logical channel using embedded overhead information from a capsule tail of the logical channel of a previous frame.

35. The wireless communications device of claim 7, wherein the mean for acquiring the logical channel during the broadcast of the frame comprises means for acquiring the logical channel using embedded overhead information from a capsule tail of the logical channel of a previous frame.

36. The method of claim 14, wherein acquiring the logical channel during broadcast of the frame comprises acquiring the logical channel using embedded overhead information from a capsule tail of the logical channel of a previous frame.

37. The computer program product of claim 24, wherein the code further causes the computer to acquire the logical channel using embedded overhead information from a capsule tail of the logical channel of a previous frame.

38. The wireless communications device of claim 1, wherein the plurality of streams on the logical channel are comprised within a single Media Access Control (MAC) capsule payload, the signaling comprised in the last stream within the MAC capsule payload.

39. The wireless communications device of claim 1, wherein the stream comprising the signaling is transmitted between the other streams of the logical channel within the MAC capsule payload and a MAC capsule header that follows the MAC capsule payload.

40. The wireless communications device of claim 1, wherein the signaling comprises information needed to receive the plurality of streams on the logical channel.

41. The wireless communications device of claim 40, wherein the signaling comprises a decryption key to decrypt at least a portion of the plurality of the streams on the logical channel.

* * * * *